(12) United States Patent
Lev et al.

(10) Patent No.: US 8,844,908 B2
(45) Date of Patent: Sep. 30, 2014

(54) HUMIDIFIER

(75) Inventors: Mordechai Lev, West Bloomfield, MI (US); Sharon DuPuy, Ferndale, MI (US)

(73) Assignee: FKA Distributing Co., Commerce Township, MI (US)

( * ) Notice: Subject to any disclaimer, the term of this patent is extended or adjusted under 35 U.S.C. 154(b) by 334 days.

(21) Appl. No.: 13/409,353

(22) Filed: Mar. 1, 2012

(65) Prior Publication Data

US 2012/0222548 A1 Sep. 6, 2012

Related U.S. Application Data

(60) Provisional application No. 61/447,915, filed on Mar. 1, 2011.

(51) Int. Cl.
*B01F 3/04* (2006.01)

(52) U.S. Cl.
USPC ............ 261/78.2; 261/81; 261/119.1; 600/28

(58) Field of Classification Search
USPC ............................ 261/81, 78.2, 119.1; 600/28
See application file for complete search history.

(56) References Cited

U.S. PATENT DOCUMENTS

| | | | | |
|---|---|---|---|---|
| 5,197,941 | A * | 3/1993 | Whitaker | 600/27 |
| 5,360,469 | A * | 11/1994 | Baron et al. | 95/273 |
| 7,727,078 | B2 | 6/2010 | Arnold, IV et al. | |
| 8,025,270 | B2 | 9/2011 | Hou | |
| 2009/0095299 | A1 | 4/2009 | Saldivar et al. | |
| 2011/0010014 | A1* | 1/2011 | Oexman et al. | 700/276 |
| 2011/0074052 | A1 | 3/2011 | Chen | |
| 2011/0221078 | A1 | 9/2011 | Lev et al. | |

* cited by examiner

*Primary Examiner* — Robert A Hopkins
(74) *Attorney, Agent, or Firm* — Brooks Kushman P.C.

(57) ABSTRACT

A humidifier includes a base having a sound machine module and a humidifier module, a water reservoir in fluid communication with the humidifier module, a user interface supported by the base, and a controller in communication with the user interface, the humidifier module, and the sound machine module. The controller is configured to operate the humidifier module to provide humidified air using water contained in the water reservoir in response to a humidifier input to the user interface. The controller is also configured to operate the sound machine module to provide sound in response to a sound input to the user interface.

14 Claims, 5 Drawing Sheets

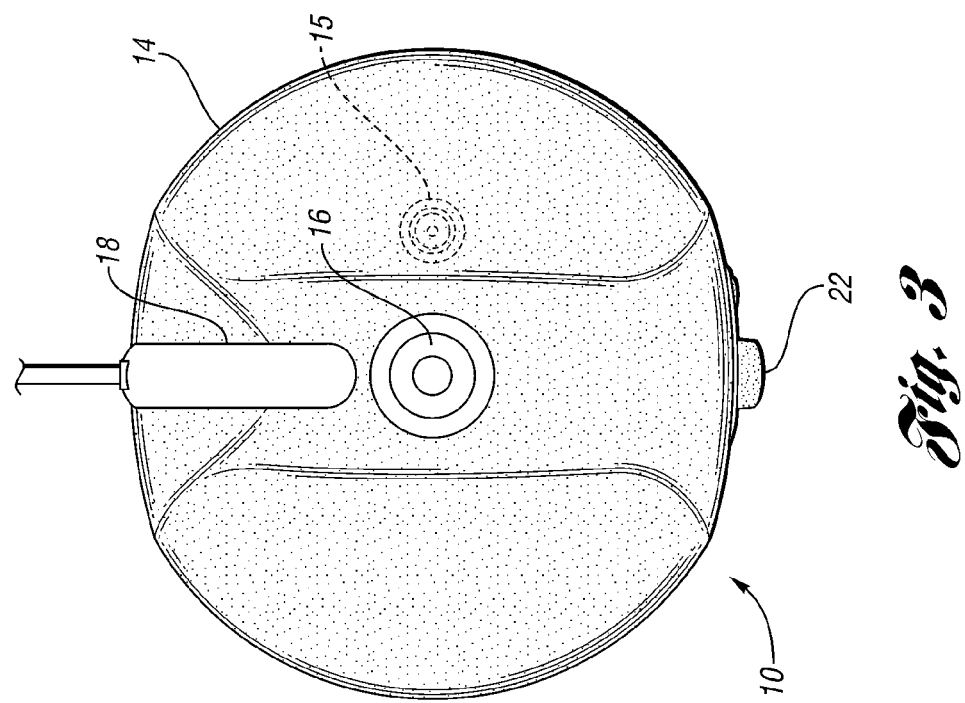
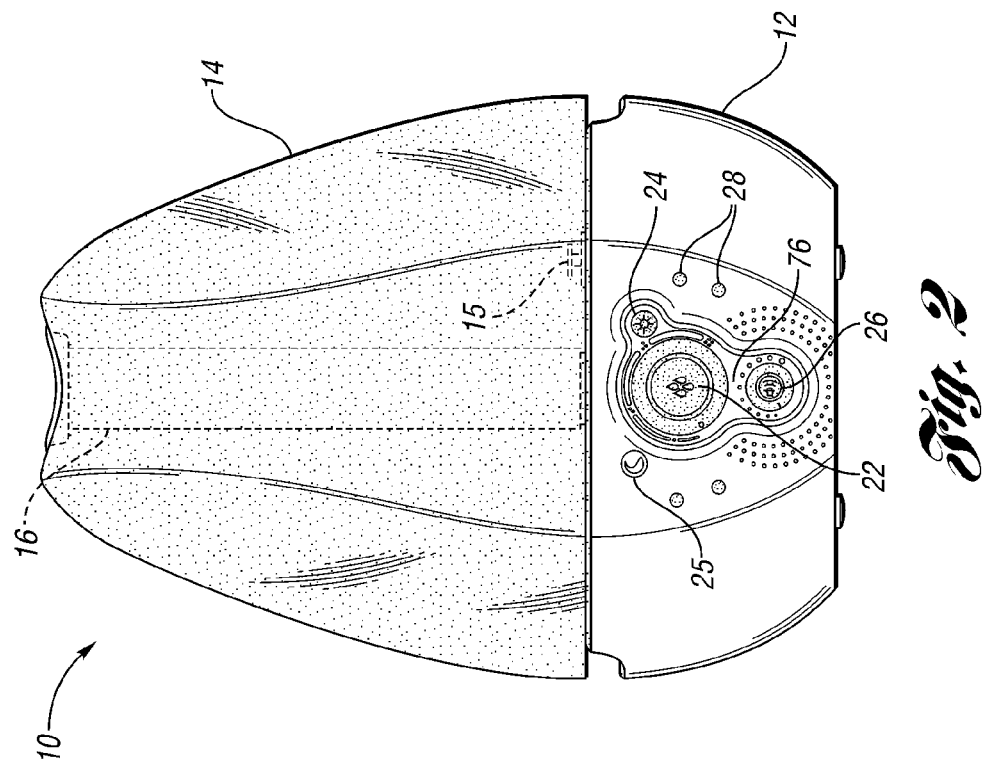

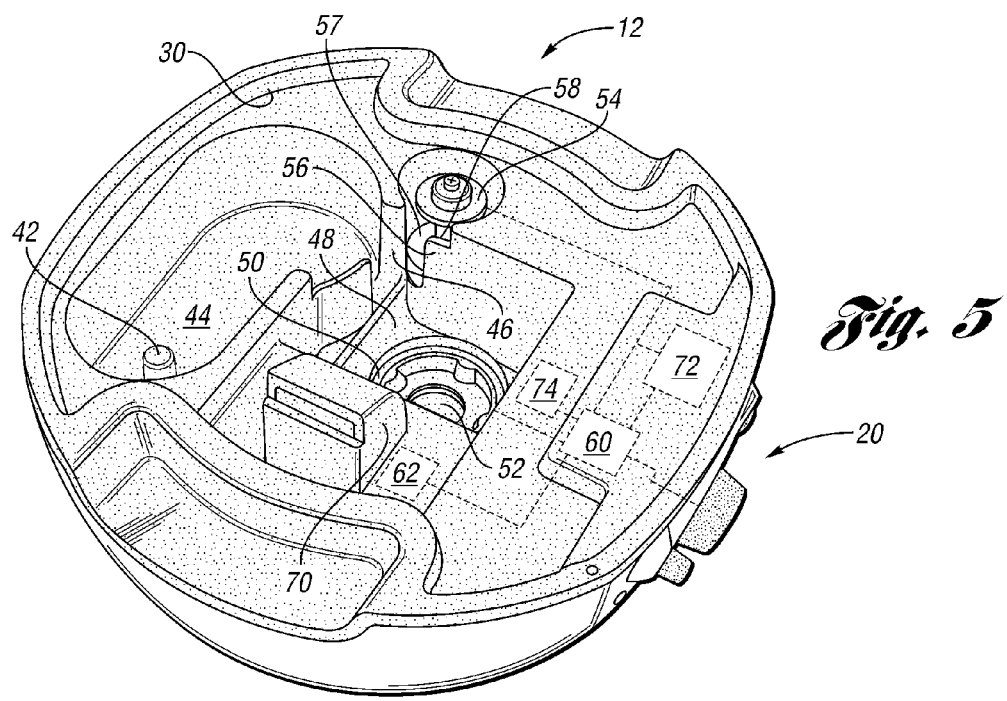
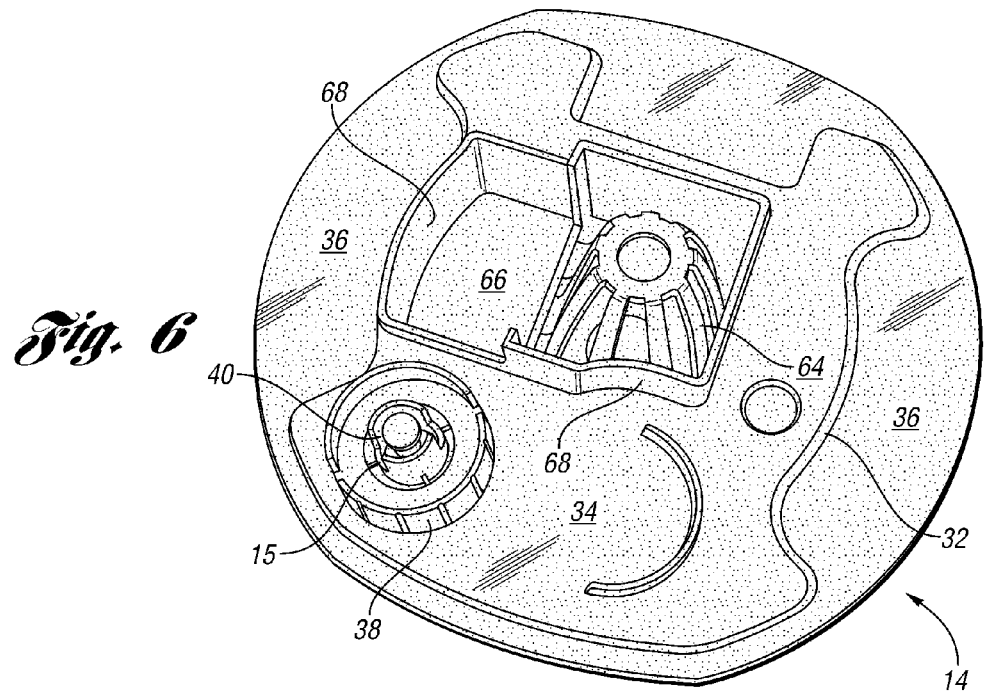

HUMIDIFIER

CROSS-REFERENCE TO RELATED APPLICATIONS

This application claims the benefit of U.S. provisional Application No. 61/447,915 filed Mar. 1, 2011, the disclosure of which is incorporated in its entirety by reference herein.

TECHNICAL FIELD

Various embodiments relate to humidifiers, including pediatric humidifiers.

BACKGROUND

Humidifiers are used to condition the air. For example, a humidifier may be used in a residential or commercial environment to increase the moisture in the air for comfort or other purposes. When an indoor environment is heated, it often needs to be humidified to provide an improved comfort level. Humidifiers may be portable such that they can be easily moved or used in a location without requiring a built-in humidifier. Humidifiers may be used in a pediatric or infant room to humidify air. The humidifier may act as a pediatric therapy unit for congestion, respiratory illnesses, skin dryness, and the like.

SUMMARY

In one embodiment, a humidifier is provided with a base having a sound machine module and a humidifier module. A water reservoir is in fluid communication with the humidifier module. A user interface is supported by the base. A controller is in communication with the user interface, the humidifier module, and the sound machine module. The controller is configured to (i) operate the humidifier module to provide humidified air using water contained in the water reservoir in response to a humidifier input to the user interface, and (ii) operate the sound machine module to provide sound in response to a sound input to the user interface.

In another embodiment, a method for controlling a humidifier is provided. A humidifier module is operated to provide humidified air using water contained in a water reservoir in response to a humidifier input to a user interface. A sound machine module is operated to provide sound in response to a sound input to the user interface.

In yet another embodiment, a humidifier is provided with a base for supporting the humidifier on an underlying surface, and a humidifier module having a diaphragm and a fan. The humidifier module is supported by the base. A water reservoir is in fluid communication with the humidifier module, and supported by the base. The water reservoir forms a duct for humidified air to flow from the humidifier module to an environment external to the humidifier. A sound machine module is supported by the base. A user interface for the humidifier has a humidifier control, a volume control, and at least one sound selection button. A controller is in communication with the user interface, the humidifier module, and the sound machine module. The controller is configured to (i) receive a humidifier input from the humidifier control, (ii) operate the humidifier module to provide humidified air from water contained in the water reservoir, (iii) receive a volume input from the volume control, (iv) receive a sound type input from the at least one sound selection button, and (iv) operate the sound machine module to provide sound in response to the volume input and the sound type input.

BRIEF DESCRIPTION OF THE DRAWINGS

FIG. 2 illustrates a front view of the humidifier of FIG. 1;
FIG. 3 illustrates a top view of the humidifier of FIG. 1;
FIG. 5 illustrates a perspective view of the base of the humidifier of FIG. 1;
FIG. 6 illustrates a perspective view of the reservoir of the humidifier of FIG. 1.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
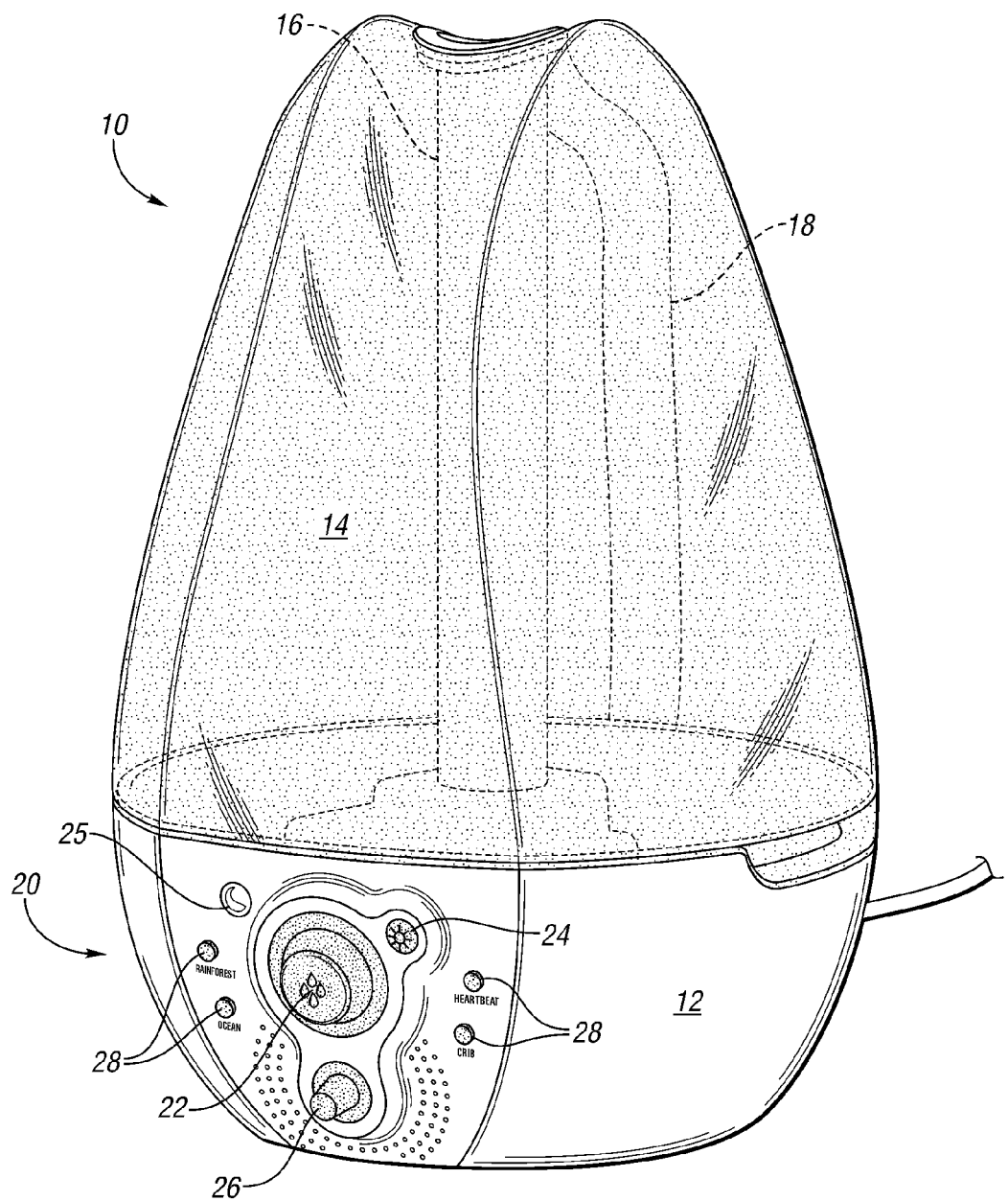
FIG. 1 illustrates a perspective view of a humidifier according to an embodiment.

With reference to FIGS. 1-3, a humidifier 10 having a sound machine, or sound spa module, is illustrated. The humidifier 10 has a humidifier module or function that provides humidified air to the environment, and a sound machine module or function that provides white noise or other sounds. The sound machine module of the humidifier 10 acts to mask or filter other ambient background noise and may be used as a sleep enhancer, for privacy, as a soothing method or the like. The humidifier 10 may be for pediatric use, although other uses are also contemplated. The humidifier 10 is a household appliance that increases humidity (moisture) in a room or in the home. In some embodiments, the humidifier 10 is a table top unit, or point-of-use humidifier, which is commonly used to humidify a single room.

The humidifier 10 has a base 12 and a water reservoir 14 removable received in the base 12. The water reservoir 14 acts as a holding tank for water to be used with the humidifier 10. Although one water reservoir 14 is shown, any number of reservoirs is contemplated for use with the humidifier 10. Water flows from the reservoir 14 through valve 15 (see FIGS. 2 and 3) and to the base 12 where it is aerosolized. The aerosolized water, or humidified air, then flows from the base 12 through a duct 16 and then exits the humidifier 10 to the environment. In one embodiment, the reservoir 14 structurally forms the duct 16. The reservoir 14 may be equipped with a handle 18 to aid a user in carrying the reservoir 14 such as when filling it with water.

The base 12 contains various user controls 20, which may include a humidity control 22, such as a dial, also acting as a humidifier power switch, a light button 24, a sleep mode button 25, a volume control 26, such as a dial, also acting as a sound machine power switch, and sound selection buttons 28. The user input 20 has two sets of controls for the humidifier 10. A first control set has user inputs to control the humidifier module of the humidifier 10 and includes the humidity control 22. A second control set has user inputs to control the sound machine module of the humidifier 10 and includes the volume control 26 and sound selection buttons 28.

Figure 4:
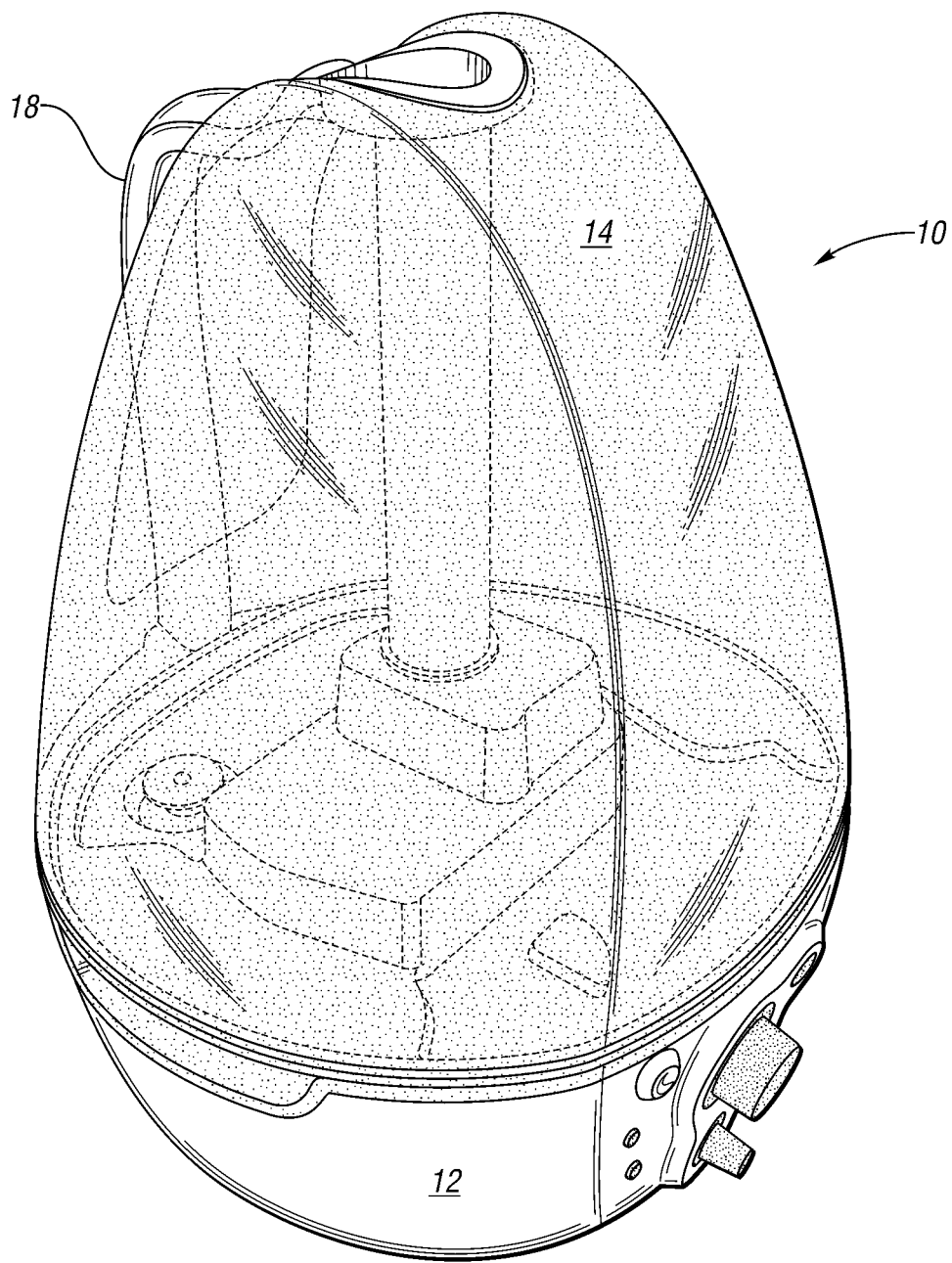
FIG. 4 illustrates another perspective view of the humidifier of FIG. 1.

Referring to the operation of the humidifier 10 with respect to FIG. 4, the reservoir 14 sits atop the base 12. The reservoir 14 is removable such that it may be refilled with water and be cleaned, and also so that the base 12 may be cleaned by a user. The reservoir 14 has a handle 18 to aid in carrying the reservoir 14. In some embodiments, the reservoir 14 is a translucent tank formed or coated with an antimicrobial additive. The antimicrobial additive prevents or reduces the formation or growth of microbes that may be present in the water. An antimicrobial additive may be added to the resin material forming the plastic tank of the reservoir 14. For example, the antimicrobial additive may be VINYZENE, VINYZENE SB-1, or other additives as are known in the art. The additive may preserve against deterioration of the plastic forming the reservoir 14 as well as reduce or prevent the growth of microbes. The humidifier 10 may also contain a filter (not shown) which acts to remove minerals or particulate matter that may be present in the water. Alternatively, the humidifier 10 may be used with distilled water, which contains low impurity levels.

Referring to FIGS. 5 and 6, the base 12 has a step 30 which mates with a corresponding step 32 on the bottom surface 34 of the reservoir 14 to locate the reservoir 14 on the base 12. Locator pins or another mechanism may be also or alternatively be used to position the reservoir 14 in place. The reservoir 14 may have a pair of recessed areas 36 to provide a handhold for a user lifting the reservoir 14 off of the base 12, for example, in preparation for filling the reservoir 14.

A cap 38 may be located on the bottom surface 34 of the reservoir 14. The cap 38 is removable, such as by a threaded fitting, to allow the reservoir 14 to be refilled with water by a user and to allow access for cleaning. Alternatively, the cap 38 may be positioned at another location on the reservoir 14. The cap 38 may also be connected to the reservoir 14 by another mechanism, and may include an o-ring or other seal to help retain the water and seal the reservoir 14. The cap 38, as shown in FIG. 6, contains valve 15. The valve 15 has a seat which is activated with a spring-loaded member 40. The spring-loaded member 40 biases the valve 15 closed when it is not actuated, such that the seat is sealed against the cap 38 and water cannot flow through. When the spring-loaded member 40 is actuated and compressed by pin 42 shown in FIG. 5, with the reservoir 14 on the base 12, the valve 15 is opened allowing water to pass through the valve 15 and to the base 12. The humidifier 10 as shown is gravity fed, as the reservoir water level is higher than the various fluid connections in the base 12.

The base 12, as shown in FIG. 5, defines a chamber 44 which has a pin 42 protruding upwards from it. The chamber 44 is sized to receive the cap 38 on the reservoir 14. As described above, the pin 42 is positioned to engage the spring-loaded member 40 of the valve 15, thereby opening the valve 15. When the reservoir 14 is positioned on the base 12, the pin 42 engages the spring-loaded member 40, thereby opening valve 15 and allowing water to flow from the reservoir 14 and into the chamber 44. The water then flows from chamber 44, through passage 46 in the base 12, and to basin 48.

The basin 48 has a recessed area 50, which contains an ultrasonic atomizer 52. The water pools in basin 48 and is aerosolized by the atomizer 52 as a cool mist. In other embodiments, the humidifier 10 may be equipped with a heater to selectively provide a warm mist. Although an ultrasonic atomizer 52 is shown for use with the humidifier 10, other mechanisms for atomizing, aerosolizing, or evaporating water are also contemplated for use with the humidifier 10.

The ultrasonic atomizer 52 may have a metal diaphragm vibrating at an ultrasonic frequency, creating water droplets that exit the humidifier 10 in the form of a cool fog or mist. The diaphragm creates pressure waves in water contained in the basin 48, which is provided by the water reservoir 14. The pressure waves are sufficiently strong to reach the surface of the water in the basin 48 above the vibrating membrane of the diaphragm to kinetically energize individual surface molecules of water into the air, thereby creating water vapor. The more water vapor created, the higher the humidity in the surrounding room. The humidity control 22 controls the ultrasonic frequency of the atomizer 52 through a controller 60, which in turn causes the atomizer 52 to vibrate at varying frequencies and cause corresponding variable humidity outputs from the humidifier 10 into the environment.

The basin 48 is connected to a water level sensor 54 by passage 56. The water level sensor 54 has an annular float 57 which slides along a post 58 and floats on any water present in the basin 48. The float 57 and/or the post 58 may contain magnetic material, such that the sensor 54 may electromagnetically detect when water is present in the basin 48. The sensor 54 is connected to the controller 60. The controller 60 may be configured to disable or shut off the humidifier function, by shutting off the atomizer 52 and a fan 62 when the sensor 54 indicates that no water or insufficient water is present in the basin 48 for the humidifier 10 to function.

The ultrasonic atomizer 52 is located on the base 12 and positioned beneath an inlet 64 to the duct 16 on the reservoir 14 (see FIG. 6). The atomizer 52 serves to aerosolize the water in the basin 48, which is then entrained by the passing air in a chamber 66 in the reservoir 14. The chamber 66 has walls 68 that mate with the base 12 to generally contain the aerosolized water and direct it into the inlet 64. An exhaust duct 70 vents air from the fan 62 into the chamber 66. The duct 70 may be positioned to increase swirl or flow of the air within the chamber 66 to increase the entrainment of aerosolized water vapor from the atomizer 52, for example, through turbulent mixing. The water-laden air then vents from the chamber 66 up through the inlet 64 and through the duct 16 to the environment.

Other embodiments of a humidifier 10 may include an alternative method and structure of aerosolizing the water or entraining the water into the air stream. For example, a spray nozzle, a pass over system, a bubbling system, or an evaporative humidifier, such as one that uses a wick or a vaporizer to vaporize the water into the passing air, may be used.

Figure 7:
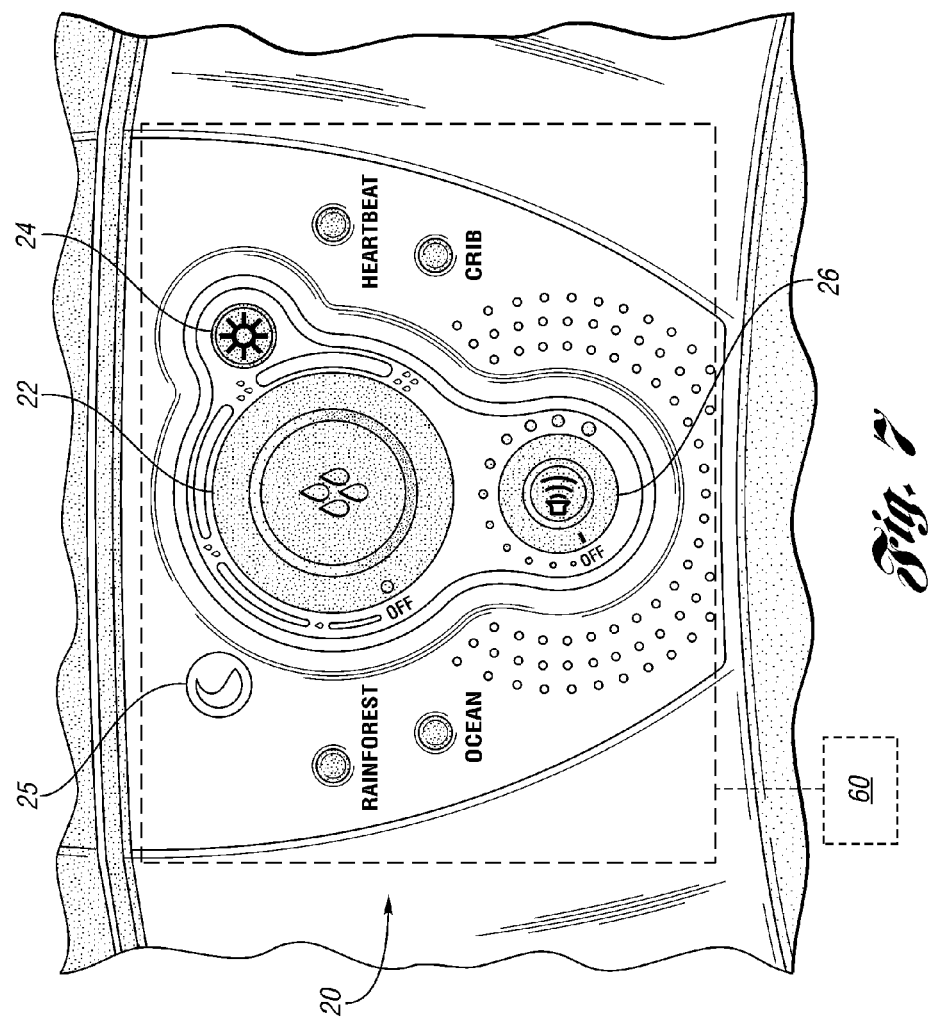
FIG. 7 illustrates a perspective view of a user interface for a humidifier according to an embodiment.

With reference to FIG. 7, the user control panel 20, or human interface, for the humidifier 10 is illustrated. The control panel 20 is connected to the controller 60. The humidifier control 22 may be a central rotatable dial for adjusting the mist output of the humidifier 10. As can be seen in the figure, when the dial is rotated to its left most position, the humidifier function is off. By rotating the dial 22 clockwise, the amount of mist or humidity output from the humidifier 10 increases based on the position of the dial 22. A button 24 is provided that activates a light feature for the humidifier 10, such as backlighting for the control panel 20, a night light feature, or the like. The backlighting for the control panel 20 may be provided by light emitting diodes (LEDs), and may be white light or colored, such as blue LEDs.

A volume control 26 may be another central rotatable dial for adjusting the volume level of the sound machine module. As can be seen in the figure, when the dial 26 is rotated to its left most position, the sound machine is off. By rotating the dial 26 clockwise, the volume of the sound from the sound machine increases and is based on the position of the dial 26.

Of course, other inputs are also considered in place of the dials 22, 26, such as sliding switches, a touch screen input, increase and decrease selector buttons, or the like. In other embodiments, the dials 22, 26 may be pushed in and pop out for activation and rotation to adjust the mist level and the volume level independently.

When the sound machine is on, i.e. the dial 26 is not in an off position, sound buttons 28 may be used to select a sound type to be played by the sound machine. In the embodiment shown in FIG. 7, four sound buttons 28 corresponding to four different sounds are shown for use with the humidifier 10; however, any number of buttons 28 is contemplated, as well as any number of sounds. For example, the sounds may represent white noise, a summer night, a heartbeat, and a cradle song. In other embodiments, the sounds may represent the ocean, rain, a rainforest, a fan, or others as are known in the art.

A sleep mode button 25 activates an automatic shutoff timer for the sound machine module. When the sleep mode button 25 is pressed after the sound machine is turned on and a sound is playing, the controller 60 turns the sound machine off after a designated time, such as thirty minutes. To turn the sound machine on after the controller 60 has turned it off in response to the sleep mode button 25, a user may cycle the dial 26 to an off position, and then turn the dial 26 so that the sound machine turns on. To return to a normal operation after the sleep mode button 25 has been activated but before the controller 60 turns the sound machine off, a user may select another sound button 28. The sleep mode then is turned off and the new selected sound will play through the sound machine until the dial 26 is turned off or the sleep mode is reactivated using the sleep mode button 25.

The controller 60 is configured such that the sound machine module may be used independently of the humidifier module on the humidifier 10. Therefore, the sound machine module may operate when the humidifier module is on, when the humidifier module is off, and also when there is no water present in the reservoir 14.

With reference to FIG. 5, when the controller 60 receives an input from the control panel 20 to turn on the sound machine from the dial 26, the controller 60 plays a sound which is stored on memory as a digital music file for example. Although the controller 60 is shown as a single module, any number of controllers may be used. The controller 60 may contain integrated memory or be connected to a separate memory module to store sound files. The controller 60 is also connected to a power source (not shown) such as an external power supply or a battery to provide power to operate the humidifier 10.

The various sounds may be selected using buttons 28 on the control panel 20. When a button 28 is activated, the controller 60 receives a signal and selects the associated sound for playing through the sound machine. The sounds may be stored as digital audio files on the memory associated with the controller 60. The controller 60 is configured to loop or cycle an audio file so that the sound may continue for a longer time period than the length of the file itself. In other embodiments, the controller 60 may be configured such that a user may load and store one or more audio files into the memory for use with the sound machine.

The controller 60 sends a signal representing the sound to a speaker module 72 (see FIG. 5). The speaker module 72 produces sound in response to the electrical audio signal input from the controller 60. The speaker module 72 may include a driver such as a conventional loudspeaker, or other speaker as is known in the art. The speaker module 72 is positioned within the base 12 of the humidifier 10. The base 12 may have apertures or other ports adjacent to the speaker module 72 for the sound to exit the humidifier 10.

The sound machine module includes the speaker module 72, the controller 60, and the inputs, such as dial 26, buttons 28 and button 25, that relate to the sound functions of the humidifier 10. The humidifier module includes the reservoir 14, the atomizer 52, the controller 60, the dial 22, the sensor 54, and the various associated water and air passages of the humidifier 10.

Additional interfaces on the control panel 20 may include a button 24 for turning on and off a light module such as a reservoir illumination system 74, which may be a light causing the reservoir 14 and any water contents to be illuminated and serve as a night light. The reservoir illumination system 74 includes a light such as an LED which is positioned to create a glow from within the reservoir 14 of the humidifier 10, providing a subtle illumination to a room. Alternatively, the light module may be a backlight illumination system 76 for the control panel 20 which acts a night light and/or to illuminate the control panel 20 for use in low light or at night. In some embodiments, the control panel 20 remains illuminated regardless of the function being used to provide easy access to the panel 20 in a night time or low light setting.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A humidifier comprising:
   a base having a sound machine module and a humidifier module;
   a water reservoir in fluid communication with the humidifier module;
   a user interface supported by the base; and
   a controller in communication with the user interface, the humidifier module, and the sound machine module, the controller configured to (i) operate the humidifier module to provide humidified air using water contained in the water reservoir in response to a humidifier input to the user interface, and (ii) operate the sound machine module to provide sound in response to a sound input to the user interface.

2. The humidifier of claim 1 wherein the user interface comprises a control for selecting a humidity output from the humidifier module, the control providing the humidity input.

3. The humidifier of claim 1 wherein the user interface comprises a volume control for selecting a volume for sound from the sound machine module, the volume control providing the sound input.

4. The humidifier of claim 1 wherein the user interface comprises at least one sound button for selecting at least one sound type, the at least one sound button providing the sound input.

5. The humidifier of claim 4 further comprising a memory module in communication with the controller, the memory module for storing the at least one sound type.

6. The humidifier of claim 4 wherein the at least one sound type includes one of an ocean sound, a summer night sound, a heartbeat sound, and a cradle song sound.

7. The humidifier of claim 1 wherein the controller is configured to operate the sound machine module independently of the humidifier module.

8. The humidifier of claim 1 wherein the controller is configured to disable the humidifier module when a water level in the water reservoir is below a threshold.

9. The humidifier of claim 1 wherein the humidifier module comprises an ultrasonic humidifier element with a diaphragm and a fan.

10. The humidifier of claim 1 wherein the water reservoir forms a duct for humidified air to flow from the humidifier module to environment external to the humidifier.

11. The humidifier of claim 1 further comprising a light module supported by the base.

12. The humidifier of claim 11 wherein the user interface comprises a light button for operating the light module.

13. The humidifier of claim 1 further comprising an antimicrobial coating on an interior surface of the water reservoir.

14. A humidifier comprising:
- a base for supporting the humidifier on an underlying surface;
- a humidifier module having a diaphragm and a fan, the humidifier module supported by the base;
- a water reservoir in fluid communication with the humidifier module, and supported by the base, the water reservoir forming a duct for humidified air to flow from the humidifier module to an environment external to the humidifier;
- a sound machine module supported by the base;
- a user interface having a humidifier control, a volume control, and at least one sound selection button; and
- a controller in communication with the user interface, the humidifier module, and the sound machine module, the controller configured to (i) receive a humidifier input from the humidifier control, (ii) operate the humidifier module to provide humidified air from water contained in the water reservoir, (iii) receive a volume input from the volume control, (iv) receive a sound type input from the at least one sound selection button, and (iv) operate the sound machine module to provide sound in response to the volume input and the sound type input.

* * * * *